United States Patent
Ogawa

(10) Patent No.: US 8,208,751 B2
(45) Date of Patent: Jun. 26, 2012

(54) IMAGE PROCESSING APPARATUS, IMAGE PROCESSING METHOD, AND PROGRAM

(75) Inventor: Takeshi Ogawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 338 days.

(21) Appl. No.: 12/591,143

(22) Filed: Nov. 10, 2009

(65) Prior Publication Data

US 2010/0129004 A1    May 27, 2010

(30) Foreign Application Priority Data

Nov. 27, 2008 (JP) ................................. 2008-302426
Dec. 8, 2008  (JP) ................................. 2008-311847

(51) Int. Cl.
*G06K 9/40* (2006.01)
(52) U.S. Cl. .......................... 382/274; 382/100; 382/254
(58) Field of Classification Search .................. 382/100, 382/254, 274
See application file for complete search history.

(56) References Cited

U.S. PATENT DOCUMENTS

| | | | |
|---|---|---|---|
| 6,243,070 B1 * | 6/2001 | Hill et al. ....................... | 345/589 |
| 7,515,119 B2 * | 4/2009 | Kim et al. ....................... | 345/63 |
| 8,004,731 B2 * | 8/2011 | Tanaka ........................... | 358/530 |
| 2004/0169874 A1 * | 9/2004 | Tone .............................. | 358/1.9 |
| 2005/0185224 A1 * | 8/2005 | Yoshizawa .................... | 358/3.26 |

FOREIGN PATENT DOCUMENTS

| | | |
|---|---|---|
| JP | 2004-72293 | 3/2004 |
| JP | 3732470 | 10/2005 |
| JP | 2007-124195 | 5/2007 |
| JP | 2009-49812 | 3/2009 |
| JP | 2010-050850 | 3/2010 |
| JP | 2010-130306 | 6/2010 |

OTHER PUBLICATIONS

Abstract of JP 2004-112089 publish Apr. 8, 2004.

\* cited by examiner

*Primary Examiner* — Stephen R Koziol
(74) *Attorney, Agent, or Firm* — Harness, Dickey & Pierce, P.L.C.

(57) ABSTRACT

An image processing apparatus, which quantizes M-level image data into N levels (M>N>2) using a multi-level error diffusion method or a multi-level average-error minimization method, includes a γ-conversion unit that performs γ-conversion on an integer part in a real number value after ideal gradation conversion that aims to obtain desired density or brightness, an area-gradation expressing unit that expresses a decimal part in the real number value by area gradation, an integerization unit that adds two values obtained through the γ-conversion and the area gradation to obtain an integerized value corresponding to the ideal gradation conversion, a correction unit that adds a peripheral error to the integerized value, and a threshold setting unit that sets an N−1-type threshold value for a value corresponding to the ideal gradation conversion, wherein the conversion to N levels is performed by using the correction value and the N−1-type threshold value.

15 Claims, 10 Drawing Sheets

FIG. 6

| INPUT VALUE | IDEAL OUTPUT VALUE |
|---|---|
| 1 | 0.52 |
| 2 | 1.34 |
| 3 | 2.05 |
| ⋮ | ⋮ |
| 254 | 232.88 |
| 255 | 255 |

FIG. 7

| INPUT VALUE | INTEGER-PART OUTPUT VALUE |
|---|---|
| 1 | 0 |
| 2 | 1 |
| 3 | 2 |
| ⋮ | ⋮ |
| 254 | 232 |
| 255 | 255 |

FIG. 8

| INPUT VALUE | DECIMAL-PART OUTPUT VALUE |
|---|---|
| 1 | 133 |
| 2 | 87 |
| 3 | 12 |
| ⋮ | ⋮ |
| 254 | 225 |
| 255 | 0 |

FIG. 9

| 0 | 128 | 32 | 160 | 8 | 136 | 40 | 168 | 2 | 130 | 34 | 162 | 10 | 138 | 42 | 170 |
|---|---|---|---|---|---|---|---|---|---|---|---|---|---|---|---|
| 192 | 64 | 224 | 96 | 200 | 72 | 232 | 104 | 194 | 66 | 226 | 98 | 202 | 74 | 234 | 106 |
| 48 | 176 | 16 | 144 | 56 | 184 | 24 | 152 | 50 | 178 | 18 | 146 | 58 | 186 | 26 | 154 |
| 240 | 112 | 208 | 80 | 248 | 120 | 216 | 88 | 242 | 114 | 210 | 82 | 250 | 122 | 218 | 90 |
| 12 | 140 | 44 | 172 | 4 | 132 | 36 | 164 | 14 | 142 | 46 | 174 | 6 | 134 | 38 | 166 |
| 204 | 76 | 236 | 108 | 196 | 68 | 228 | 100 | 206 | 78 | 238 | 110 | 198 | 70 | 230 | 102 |
| 60 | 188 | 28 | 156 | 52 | 180 | 20 | 148 | 62 | 190 | 30 | 158 | 54 | 182 | 22 | 150 |
| 252 | 124 | 220 | 92 | 244 | 116 | 212 | 84 | 254 | 126 | 222 | 94 | 246 | 118 | 214 | 86 |
| 3 | 131 | 35 | 163 | 11 | 139 | 43 | 171 | 1 | 129 | 33 | 161 | 9 | 137 | 41 | 169 |
| 195 | 67 | 227 | 99 | 203 | 75 | 235 | 107 | 193 | 65 | 225 | 97 | 201 | 73 | 233 | 105 |
| 51 | 179 | 19 | 147 | 59 | 187 | 27 | 155 | 49 | 177 | 17 | 145 | 57 | 185 | 25 | 153 |
| 243 | 115 | 211 | 83 | 251 | 123 | 219 | 91 | 241 | 113 | 209 | 81 | 249 | 121 | 217 | 89 |
| 15 | 143 | 47 | 157 | 7 | 135 | 39 | 167 | 13 | 141 | 45 | 173 | 5 | 133 | 37 | 165 |
| 207 | 79 | 239 | 111 | 199 | 71 | 231 | 103 | 205 | 77 | 237 | 109 | 197 | 69 | 229 | 101 |
| 63 | 191 | 31 | 159 | 55 | 183 | 23 | 151 | 61 | 189 | 29 | 157 | 53 | 181 | 21 | 149 |
| 254 | 127 | 223 | 95 | 247 | 119 | 215 | 87 | 253 | 125 | 221 | 93 | 245 | 117 | 213 | 85 |

FIG. 12
| | * | 7/16 |
|---|---|---|
| 5/16 | 3/16 | 1/16 |
FIG. 13
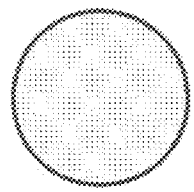
(a) LOW-DENSITY INK DOT
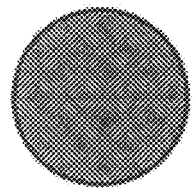
(b) HIGH-DENSITY INK DOT

FIG. 16

| 0 | 12 | 32 | 16 | 8 | 13 | 40 | 16 | 2 | 13 | 34 | 16 | 10 | 13 | 42 | 17 |
|---|---|---|---|---|---|---|---|---|---|---|---|---|---|---|---|
| 19 | 64 | 22 | 96 | 20 | 72 | 23 | 10 | 19 | 66 | 22 | 98 | 20 | 74 | 23 | 10 |
| 48 | 17 | 16 | 14 | 56 | 18 | 24 | 15 | 50 | 17 | 18 | 14 | 58 | 18 | 26 | 15 |
| 24 | 11 | 20 | 80 | 24 | 12 | 21 | 88 | 24 | 11 | 21 | 82 | 25 | 12 | 21 | 90 |
| 12 | 14 | 44 | 17 | 4 | 13 | 36 | 16 | 14 | 14 | 46 | 17 | 6 | 13 | 38 | 16 |
| 20 | 76 | 23 | 10 | 19 | 68 | 22 | 10 | 20 | 78 | 23 | 11 | 19 | 70 | 23 | 10 |
| 60 | 18 | 28 | 15 | 52 | 18 | 20 | 14 | 62 | 19 | 30 | 15 | 54 | 18 | 22 | 15 |
| 25 | 12 | 22 | 92 | 24 | 11 | 21 | 84 | 25 | 12 | 22 | 94 | 24 | 11 | 21 | 86 |
| 3 | 13 | 35 | 16 | 11 | 13 | 43 | 17 | 1 | 12 | 33 | 16 | 9 | 13 | 41 | 16 |
| 19 | 67 | 22 | 99 | 20 | 75 | 23 | 10 | 19 | 65 | 22 | 97 | 20 | 73 | 23 | 10 |
| 51 | 17 | 19 | 14 | 59 | 18 | 27 | 15 | 49 | 17 | 17 | 14 | 57 | 18 | 25 | 15 |
| 24 | 11 | 21 | 83 | 25 | 12 | 21 | 91 | 24 | 11 | 20 | 81 | 24 | 12 | 21 | 89 |
| 15 | 14 | 47 | 15 | 7 | 13 | 39 | 16 | 13 | 14 | 45 | 17 | 5 | 13 | 37 | 16 |
| 20 | 79 | 23 | 11 | 19 | 71 | 23 | 10 | 20 | 77 | 23 | 10 | 19 | 69 | 22 | 10 |
| 63 | 19 | 31 | 15 | 55 | 18 | 23 | 15 | 61 | 18 | 29 | 15 | 53 | 18 | 21 | 14 |
| 25 | 12 | 22 | 95 | 24 | 11 | 21 | 87 | 25 | 12 | 22 | 93 | 24 | 11 | 21 | 85 |

IMAGE PROCESSING APPARATUS, IMAGE PROCESSING METHOD, AND PROGRAM

CROSS-REFERENCE TO RELATED APPLICATIONS

The present application claims priority to and incorporates by reference the entire contents of Japanese Patent Application No. 2008-302426 filed in Japan on Nov. 27, 2008 and Japanese Patent Application No. 2008-311847 filed in Japan on Dec. 8, 2008.

BACKGROUND OF THE INVENTION

1. Field of the Invention

The present invention relates to an image processing apparatus, an image processing method, and a program.

2. Description of the Related Art

There exists an image input-output system that outputs multi-level image data read by an input device such as a scanner or a digital camera to an output device such as a printer or a display. There is a process called a pseudo-halftone process as a method of converting, when the multi-level image data is to be output, the multi-level image data read by the input device (for example, 256-level gray scale in 8-bit accuracy) to image data having the number of gradations that can be output by the output device, and of expressing continuous gradation in a pseudo manner. If the output device can express only binary values "ON/OFF" of dot, a binarizing process is conventionally performed. The binarizing process includes a dither process capable of performing a high-speed process, and also an error diffusion method and an average-error minimization method which are excellent in both resolution capability and gradation capability.

The error diffusion method mentioned here represents a type of method for smoothly expressing an image through a halftone process. This method is implemented by minimizing an error as a whole by allocating the error produced by the process for pixels of a digital image to neighboring pixels and performing the process afterward considering the influence of the allocation of the error on the neighboring pixels.

The average-error minimization method mentioned here represents a method for determining each value of pixels so that a difference between gray values of an original image and values expressed by binarizing the original image is reduced on the average.

The error diffusion method and the average-error minimization method are different from each other only in when to perform an error diffusion operation, and are logically equivalent to each other. There is also a multi-level error diffusion method based on the error diffusion method that is further applied to not only binary gradation but also ternary or higher gradation. The multi-level error diffusion method, similarly to a binary error diffusion method, allows the process excellent in gradation capability and resolution capability.

There are various methods used to ensure the ternary or higher gradation in the output device.

An inkjet printer reproduces the ternary or higher gradation by changing each dot diameter of large, medium, and small dots under control of an amount of ink to be ejected, by overstriking dots, or by using inks of different densities i.e., high- and low-density inks.

The density of the low-density ink is usually diluted to ½ to ⅙ of the high-density ink. In addition, there is a method of ensuring the ternary or higher gradation by controlling an amount of ink to be transferred to a paper due to change of an engraved depth to a plate in relief printing such as gravure printing.

Incidentally, when electrophotographic printing is performed by a printing machine or an inkjet printer, there sometimes occurs a phenomenon so-called dot gain that obtained halftone dots are bigger, as compared with original halftone dots, caused by ink bleed or ink spread. In an error diffusion process, a locally produced error is diffused to neighboring pixels and is fed-back so as to keep the density. However, because of the dot gain, the halftone dots become bigger with respect to an original input value in a high-density portion, which causes density saturation to easily occur in the high-density portion.

If the dither process is used for image processing, there is no problem because designing can be done by considering the influence of the dot gain on the high-density portion.

Here, a dither method is a method of displaying a gray image by binary values (black and white). This is similar to ordinary binarization. Thus, by performing the binarization with threshold values that randomly change, the image seems to have shades of black and white though the shades are binary values seen from a distance. This is a result of using an optical illusion of the human eye. The dither method is used for photographs of newspapers or color printers.

As for the dither, it is general to use a super cell formed as a rectangle in which a plurality of minimum unit cells forming the dither is combined. If the dither is the super cell whose size is 32×32 and is used for a 1-bit dither process, 1025 dot patterns can be output.

Incidentally, because multi-level image data read by an ordinary input device is 8 bits=256 levels, the 1025 dot patterns are not required. If 256 dot patterns are selected from the number of logically outputtable gradations which is determined from 1025 being the size of the super cell so as to obtain a target brightness or density curve considering the dot gain, then the influence of the dot gain can be made less visible.

Generally, because the dot gain may occur, to use the error diffusion process in ordinary printers, a γ-converted image is subjected to the error diffusion process.

As shown in FIG. 6, if the value after the γ-conversion can be a real number, no problem will occur in the error diffusion.

When a gray-scale level 1 is input in a certain printer, by using a value of 0.52 shown in FIG. 6 to perform the error diffusion, brightness or density corresponding to the input value 1 can be expressed by the dot gain. If the value after the γ-conversion is the real number as shown in FIG. 6, an error diffusion portion has to be also calculated using the real number. In this case, a space of a memory or the like that stores therein errors increases.

Error diffusion technologies considering the dot gain are disclosed in Patent document 1 (Japanese Patent Application Laid-open No. 2007-124195) and Patent document 2 (Japanese Patent Application Laid-open No. 2004-72293).

In the error diffusion method disclosed in Patent document 1, error diffusion is performed in the error diffusion portion by converting 8 bits as an input value to 14 bits. Each input value is not simply increased to 64 times when the number of bits is increased, but the input value is converted to a value expressing target brightness or density considering the dot gain, and this allows sufficient gradation capability.

Patent document 2 discloses that by setting a total of coefficients to diffuse an error to less than 1, the density is not maintained. Based on this, there is characteristic that the density is hard to be saturated in the high-density portion.

Patent document 3 (Japanese Patent Application No. 2007-215289) describes a technique for expressing target brightness or density considering the dot gain by using a plurality of reduction tables in a reduction portion of an error. The invention disclosed in Patent document 3 does not require an error memory more than that for the invention described in Patent document 1.

There are Patent documents 4 and 5 as γ-conversion technologies for error diffusion considering the dot gain.

The invention described in Patent document 4 (Japanese Patent Application No. 2008-214676) is a technology to express a value after the decimal point of a real number value being the value after γ-conversion as shown in FIG. 6, by using area gradation.

Incidentally, the multi-level error diffusion includes one that sets a threshold value according to an input pixel like an invention disclosed in Patent document 6 (Japanese Patent No. 3732470). The invention disclosed in Patent document 6 is a technology to suppress a false contour appearing in gradations due to delay in dot generation occurring in a multi-level switching portion.

An invention described in Patent document 5 (Japanese Patent Application No. 2008-302426), similarly to the invention described in Patent document 4, is a technology to suppress image quality degradation in the multi-level switching portion using the multi-level error diffusion in which area gradation is performed on a value after the decimal point in a real number value obtained after the γ-conversion.

However, in the invention disclosed in Patent document 1, an error memory is required more than that for error diffusion performed on an 8-bit input although the error memory is required less than that for error diffusion performed on the value being a real number obtained after the γ-conversion.

In the invention disclosed in Patent document 2, although the density is hard to be saturated in the high-density portion, dot generation is delayed in a highlight portion because the error is equally distributed by a value of less than 100%.

In the invention disclosed in Patent document 3, it is possible to execute the process with less memory space, however, it is necessary to switch between a plurality of reduction tables in which gradation characteristic is described in each printing mode. Because of this, when the error diffusion process is executed by hardware, it becomes difficult for the invention to support many modes.

In the invention disclosed in Patent document 5, both a γ-conversion table and a threshold table need to be held according to CMYK color plates or the like.

In the invention disclosed in Patent document 6, as a result of subjecting the multi-level error diffusion to the γ-conversion as shown in the invention described in Patent document 4, the image quality degradation occurs in the multi-level switching portion.

A system for achieving the saving in memory while improving the gradation capability in the multi-level error diffusion and suppressing the image quality degradation in the multi-level switching portion has been desired.

SUMMARY OF THE INVENTION

It is an object of the present invention to at least partially solve the problems in the conventional technology.

According to an aspect of the present invention there is provided an image processing apparatus that quantizes multi-level (M-level) image data into N levels (M>N>2) using a multi-level error diffusion method or a multi-level average-error minimization method, the image processing apparatus including a γ-conversion unit that performs γ-conversion on an integer part in a real number value after ideal gradation conversion that aims to obtain desired density or brightness; an area-gradation expressing unit that expresses a decimal part by area gradation, the decimal part being in the real number value after the ideal gradation conversion; an integerization unit that adds a value obtained through the γ-conversion and a value expressed by the area gradation to obtain an integerized value corresponding to a value of the ideal gradation conversion; a correction unit that adds a peripheral error to the integerized value to obtain a correction value; and a threshold setting unit that sets an N−1-type threshold value for a value corresponding to the value after the ideal gradation conversion, wherein the conversion to N levels is performed by using the correction value and the N−1-type threshold value, to thereby express the real number value after the ideal gradation conversion so that input multi-level (M-level) image data obtains the desired density or brightness.

According to another aspect of the present invention there is provided an image processing method for an image processing apparatus that quantizes multi-level (M-level) image data into N levels (M>N>2) using a multi-level error diffusion method or a multi-level average-error minimization method, the image processing method including a step of γ-converging by a γ-conversion unit that performs γ-conversion on an integer part in a real number value after ideal gradation conversion that aims to obtain desired density or brightness; a step of area-gradation expressing by an area-gradation expressing unit that expresses a decimal part by area gradation, the decimal part being in the real number value after the ideal gradation conversion; an step of integerizing by an integerizing unit that adds a value obtained through the γ-conversion and a value expressed by the area gradation to obtain an integerized value corresponding to a value of the ideal gradation conversion; a step of correcting by a correcting unit that adds a peripheral error to the integerized value to obtain a correction value; and a step of threshold setting by a threshold setting unit that sets an N−1-type threshold value for a value corresponding to the value after the ideal gradation conversion, wherein the conversion to N levels is performed by using the correction value and the N−1-type threshold value, to thereby express the real number value after the ideal gradation conversion so that input multi-level (M-level) image data obtains the desired density or brightness.

According to still another aspect of the present invention there is provided a program for causing a computer to execute a control process of an image processing apparatus that quantizes multi-level (M-level) image data into N levels (M>N>2) using a multi-level error diffusion method or a multi-level average-error minimization method, in order to express a real number value after ideal gradation conversion so that input multi-level (M-level) image data obtains desired density or brightness, the program including a code for a step of performing γ-conversion on an integer part in the real number value after the ideal gradation conversion; a code for a step of expressing a decimal part by area gradation, the decimal part being in the real number value after the ideal gradation conversion; a code for a step of adding a value obtained through the γ-conversion and a value expressed by the area gradation to obtain an integerized value corresponding to an ideal gradation converted value; a code for a step of adding a peripheral error to the integerized value to obtain a correction value; and a code for a step of setting an N−1-type threshold value for conversion to N levels according to a value corresponding to the ideal gradation converted value, wherein the conversion to N levels is performed by using the correction value and the N−1-type threshold value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is an example of a table which stores therein input values and ideal output values used in the image processing apparatus shown in FIG. 1;

FIG. 7 is an example of a table which stores therein input values and integer-part output values used in the image processing apparatus shown in FIG. 1;

FIG. 8 is an example of a conversion table for multiplying each value after the decimal point in the conversion table shown in FIG. 6 by a matrix size 256 (16×16) of dither, and for converting each of multiplied value to obtain each of value with decimal part rounded down each;

FIG. 9 represents the matrix size 256 (16×16) of the dither;

FIG. 12 is an example of diffusion coefficients;

FIG. 13 is a conceptual diagram of other dots due to the image recording apparatus shown in FIG. 2;

FIG. 16 is a diagram representing an example of a dither matrix according to the second embodiment.

DETAILED DESCRIPTION OF THE PREFERRED EMBODIMENTS

Embodiments to execute the present invention are explained below.

A first embodiment of the present invention is explained in detail below with reference to accompanying drawings.

Signs are given to components to discriminate therebetween.

Figure 3:
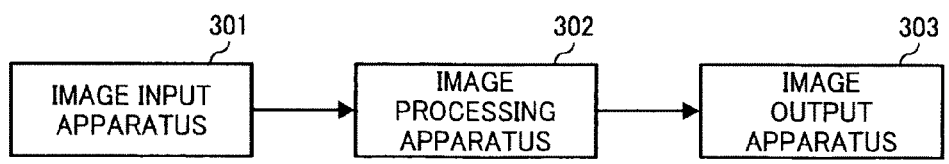
FIG. 3 is a diagram representing an example of a configuration of an image input-output system formed with the image processing apparatus according to the embodiment.

FIG. 3 is a diagram representing an example of a configuration of an image input-output system formed with an image processing apparatus according to the first embodiment of the present invention.

An image input apparatus 301 indicates an input device such as a scanner or a digital camera, and an input image is taken-in as image data with 256-level gray scale in, for example, 8-bit accuracy. This multi-level image data is input to an image processing apparatus 302 of the present embodiment.

The image processing apparatus (image processor) 302 performs a process for converting the image data with 256-level gray scale input from the image input apparatus 301 to the number of gradations that can be output from an image output apparatus 303 in the subsequent stage. The multi-level error diffusion and a multi-level average-error minimization method may be used in the conversion process for the number of gradations. The image data quantized by the image processing apparatus 302 is sent to an image recording apparatus (image forming apparatus, image output apparatus) 303 configured as shown in FIG. 2.

Figure 2:
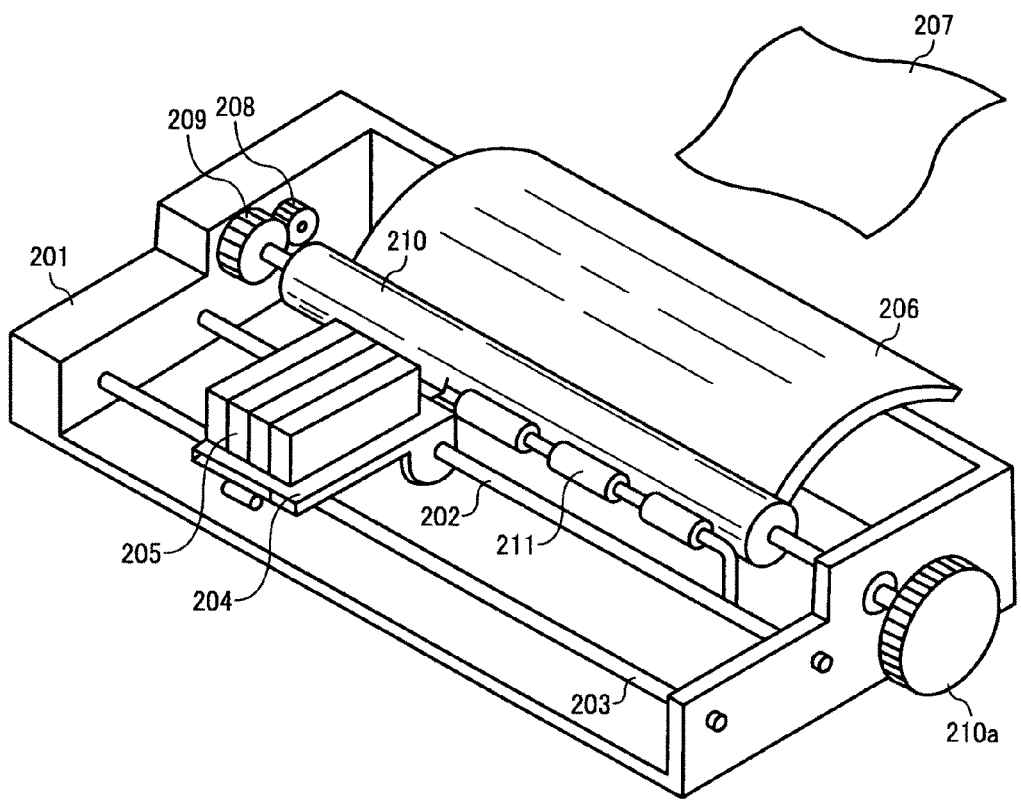
FIG. 2 is a schematic representing an example of a configuration of an image recording apparatus according to the embodiment.

FIG. 2 is a schematic representing an example of a configuration of the image recording apparatus according to the embodiment of the present invention.

In FIG. 2, the image output apparatus 303 (see FIG. 3) has an inkjet recording head 205 (hereinafter, simply called "recording head") mounted on a carriage 204 movably provided along guide rails 202 and 203 that are bridged laterally across a frame 201, and causes a drive source such as a motor (not shown) to move the carriage along a guide rail direction, which allows scanning (main scanning).

The image output apparatus 303 takes a paper 207 set in a guide plate 206 into a platen 210 provided with a feed knob 210a made to rotate via a drive gear 208 and a sprocket gear 209 by a drive source (not shown), and conveys the paper 207 by a circumferential surface of the platen 210 and by a pressure roller 211 in pressure contact therewith, and the paper 207 is printed and recorded by the recording head 205.

Figure 4:
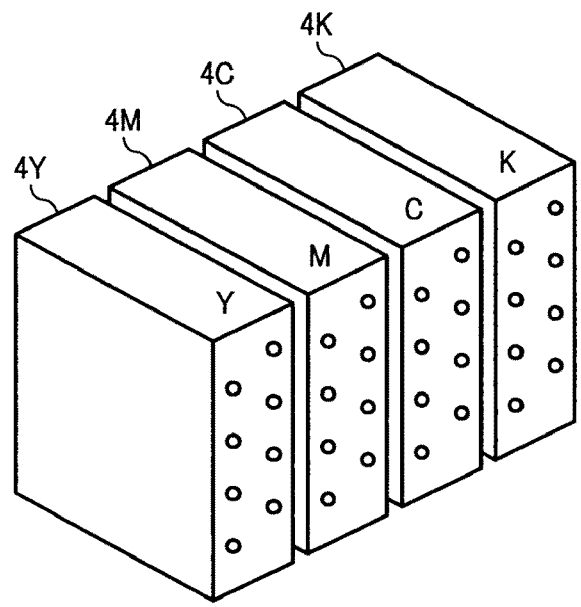
FIG. 4 is an external perspective view representing an example of an inkjet head used for the image recording apparatus shown in FIG. 2.
Figure 5:
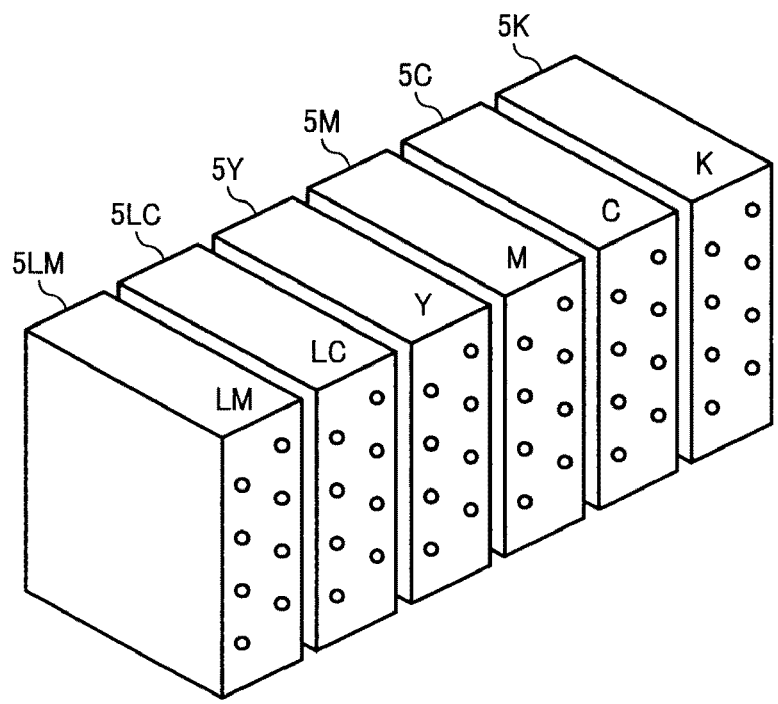
FIG. 5 is an external perspective view representing another example of the inkjet head shown in FIG. 4.

FIG. 4 is an external perspective view representing an example of an inkjet head used for the image recording apparatus shown in FIG. 2, and FIG. 5 is an external perspective view representing another example of the inkjet head shown in FIG. 4.

The recording head 205 being the inkjet head is formed with four inkjet heads (4K, 4Y, 4M, and 4C) to eject inks of black (K), yellow (Y), magenta (M), and cyan (C) respectively as shown in FIG. 4, or with six inkjet heads (5K, 5Y, 5M, 5C, 5LM, and 5LC) to eject inks of black (K), yellow (Y), magenta (M), cyan (C), light magenta (LM), and light cyan (LC) respectively as shown in FIG. 5, which are arranged along the same line in a main scanning direction.

The inkjet head may be configured to increase or decrease the number of inks depending on product lineup. More specifically, the inkjet head may be a recording head that achieves high image quality based on a configuration in which each density of colors: light black, cyan, magenta, yellow, and black is divided into three levels or four levels.

Each of the inkjet heads selectively drives an actuator being an energy generator such as a piezoelectric element or a bubble-forming heater and applies pressure to the ink in a liquid chamber, to allow ink droplets to be ejected and sprayed from a nozzle communicating the liquid chamber, and the ink droplets are caused to adhere the paper 207 (see FIG. 2), so that an image is recorded (an image is formed). Even if the image output apparatus 303 uses electrophotography to record an image (form an image), the processing method according to the present invention can be applied thereto.

Figure 11:
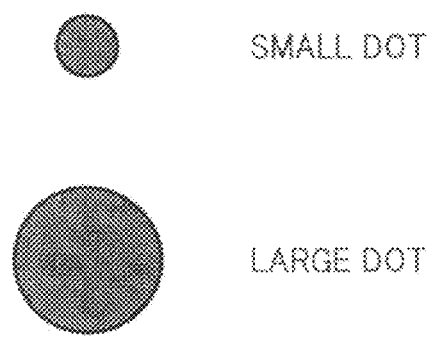
FIG. 11 is a conceptual diagram of dots due to the image recording apparatus shown in FIG. 2.

Now, it is assumed that the image output apparatus 303 shown in FIG. 2 is an inkjet head that changes large and small dots and dot diameters as shown in FIG. 11 and gray-scale levels of the large and small dots are set to 255 and 127, respectively.

Further, the diagram of the system configuration in FIG. 3 shows the apparatuses respectively provided as independent ones according to processes, however, the system configuration is not limited thereto. Thus, there are also configurations, in one of which the function of the image processing apparatus 302 may exist in the image input apparatus 301, and in another one of which the function of the image processing apparatus 302 may exist in the image output apparatus 303.

Figure 1:
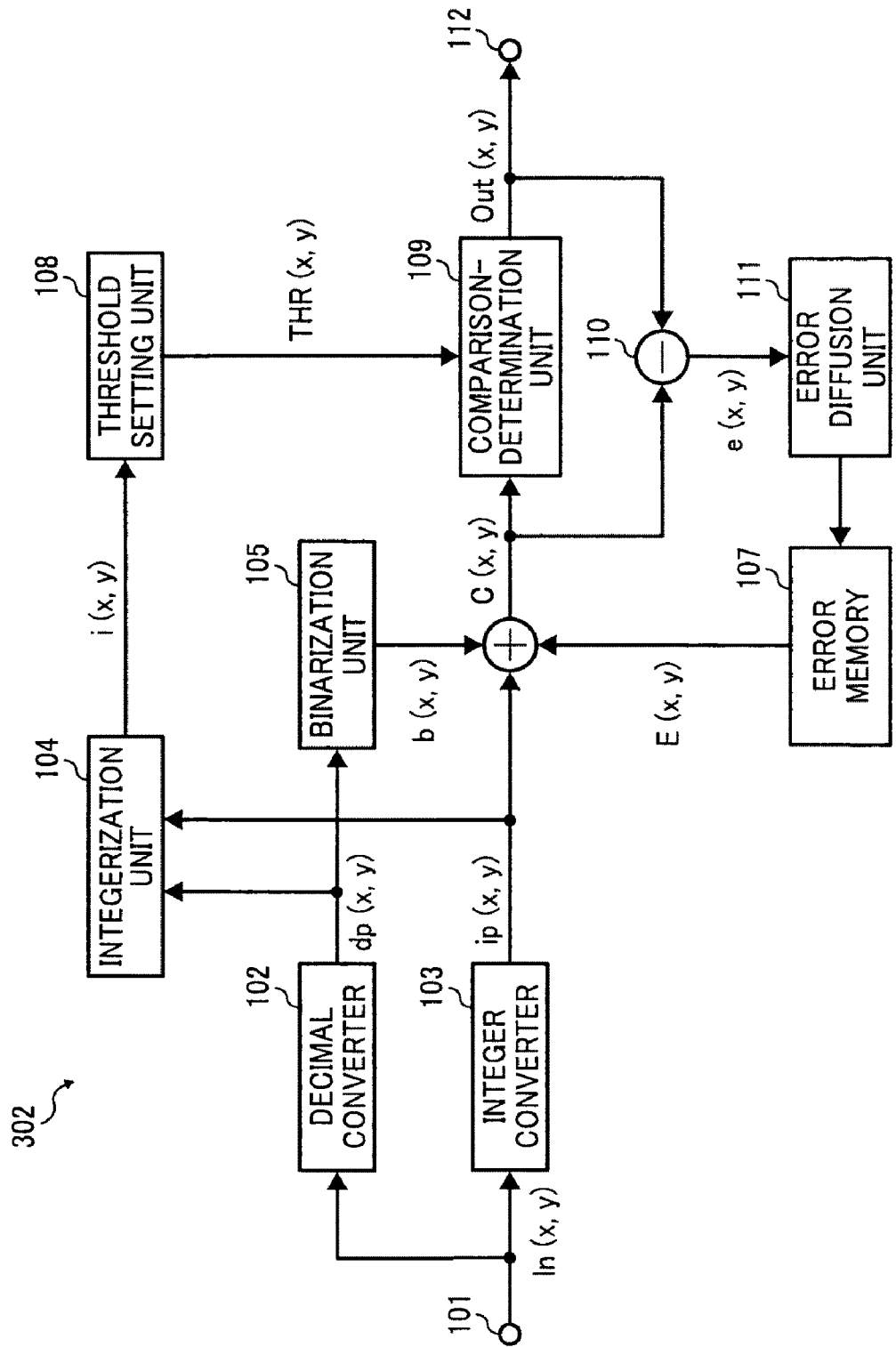
FIG. 1 is an example of a block diagram representing a configuration of an image processing apparatus according to a present embodiment shown in FIG. 3.

FIG. 1 is an example of a block diagram representing a configuration of the image processing apparatus 302 according to the present embodiment shown in FIG. 3.

The image processing apparatus 302 shown in FIG. 1 includes a decimal converter 102 and an integer converter 103 which are connected to an input terminal 101, an integerization unit 104, a binarization unit 105, an adder 106, an error memory 107, a threshold setting unit 108, a comparison-determination unit 109 and a subtractor 110 which are connected with an output terminal 112, and an error diffusion unit 111.

Input to the input terminal 101 is multi-level image data from the image input apparatus 301. Here, to express two-dimensional image data, input data is expressed as In(x, y) (where x represents address of the image in a main scanning direction and y represents address thereof in a sub-scanning direction).

Next, the input data In(x, y) is input to the integer converter 103 and the decimal converter 102. The integer converter 103 holds a table as shown in FIG. 6, and outputs an integer-part converted value ip(x, y) derived from the input data In(x, y) to the adder 106 and the integerization unit 104.

FIG. 6 is an example of the table which stores therein input values and ideal output values used in the image processing apparatus shown in FIG. 1.

Likewise, the decimal converter 102 holds a table as shown in FIG. 7, and outputs a decimal-part converted value dp(x, y) derived from the input data In(x, y) to the binarization unit 105 and the integerization unit 104.

FIG. 7 is an example of the table which stores therein input values and integer-part output values used in the image processing apparatus shown in FIG. 1.

The integerization unit 104 generates an integerized value i(x, y) based on the integer-part converted value ip(x, y) input from the integer converter 103 and the decimal-part converted value dp(x, y) input from the decimal converter 102, and outputs the generated value to the threshold setting unit 108.

Here, if the decimal-part converted value dp(x, y) input from the decimal converter 102 is not 0, a value obtained by adding 1 to the integer-part converted value ip(x, y) input from the integer converter 103 is set as the integerized value i(x, y). If the decimal-part converted value dp(x, y) is 0, the integer-part converted value ip(x, y) input from the integer converter 103 is set as the integerized value i(x, y).

Figure 10:
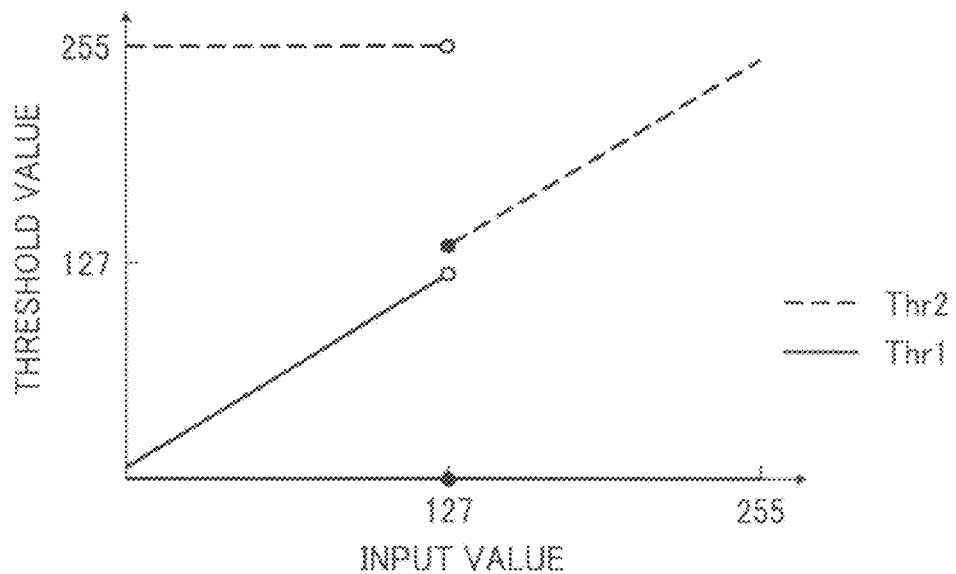
FIG. 10 is a diagram representing a relationship between an input value and a threshold value in the image processing apparatus shown in FIG. 1.

The threshold setting unit 108 sets a threshold group thr(x, y), as shown in FIG. 10, according to the input value as the integerized value i(x, y) input from the integerization unit 104, and outputs the threshold group thr(x, y) to the comparison-determination unit 109.

FIG. 10 is a diagram representing a relationship between an input value and a threshold value in the image processing apparatus shown in FIG. 1. In FIG. 10, a horizontal-axis represents the input value and a vertical axis represents the threshold value.

The threshold group thr(x, y) mentioned here is composed of a first threshold value $thr1(x, y)$ used for determining a "dot-off" and a small dot and a second threshold value $thr2(x, y)$ used for determining a small dot and a large dot.

The binarization unit 105 holds threshold values shown in FIG. 9. Binarization is performed according to Equation (1) using a binarized threshold value bt(x, y) according to address (x, y) of the input data In(x, y) and the decimal-part converted value dp(x, y) input from the decimal converter 102.

$$b(x, y) = \begin{cases} \text{If } dp(x, y) g.e. bt(x, y) \\ 1 \\ \text{otherwise} \\ 0 \end{cases} \quad (1)$$

A decimal-part binary value b(x, y) as a result of the binarization is output to the adder 106. Here, "g. e." means "greater than or equal to".

The adder 106 adds the integer-part converted value ip(x, y) input from the integer converter 103, the decimal-part binary value b(x, y) input from the binarization unit 105, and an error component E(x, y) input from the error memory 107, calculates correction data C(x, y), and outputs the correction data C(x, y) to the comparison-determination unit 109 and the subtractor 110.

The comparison-determination unit 109 determines an output value Out(x, y), as shown in Equation (2), based on the correction data C(x, y) input from the adder 106 and the threshold group thr(x, y) input from the threshold setting unit 108.

$$out(x, y) = \begin{cases} \text{If } C(x, y) g.e. thr2(x, y) \\ 2 \\ \text{Else if } C(x, y) g.e. thr1(x, y) \\ 1 \\ \text{otherwise} \\ 0 \end{cases} \quad (2)$$

The threshold group thr(x, y) mentioned here is composed of an output-determination threshold value $thr1(x, y)$ for a dot-off and a small dot, and of an output-determination threshold value $thr2(x, y)$ for a small dot and a large dot.

The output value Out(x, y) is output from the output terminal 112 to the image output apparatus 303.

Further, the output value Out(x, y) is input to the subtractor 110. The subtractor 110 performs subtraction between the correction data C(x, y) and the output value Out(x, y) as shown in Equation (3), to calculate an error e(x, y) produced in a current pixel. The subtractor 110 outputs the error e(x, y) to the error diffusion unit 111.

$$e(x,y)=C(x,y)-\text{Out}(x,y) \quad (3)$$

Next, the error diffusion unit 111 distributes the error e(x, y) based on preset diffusion coefficients to be added to error data E(x, y) stored in the error memory 107. When, for example, coefficients as shown in FIG. 12 are used as the diffusion coefficients, the error diffusion unit 111 performs processes as shown in following Equations (4) to (7).

$$E(x+1,y)=E(x+1,y)+e(x,y)\times 7/16 \quad (4)$$

$$E(x-1,y+1)=E(x-1,y+1)+e(x,y)\times 5/16 \quad (5)$$

$$E(x,y+1)=E(x,y+1)+e(x,y)\times 3/16 \quad (6)$$

$$E(x+1,y+1)=E(x+1,y+1)+e(x,y)\times 1/16 \quad (7)$$

As explained above, the binary error diffusion process is performed by the image processing apparatus 302 based on the configuration in FIG. 1.

Next, the reason why the process is effective against the dot gain during the multi-level error diffusion process is explained below.

Now, it is assumed that the target brightness or density considering the dot gain can be expressed when the γ-conversion to the real number value as shown in FIG. 6 can be performed. The conversion table in FIG. 7 shows values having been converted to the values in the integer parts in the conversion table of FIG. 6. Further, the conversion table in FIG. 8 shows values having been converted to values obtained by multiplying the values after the decimal point in the conversion table of FIG. 6 by the matrix size 256 (16×16) of the dither shown in FIG. 9 and rounding down each value after the decimal point in resulting values.

The result of conversion of the gray-scale level 1 in the conversion table of FIG. 8 is 133. When this value 133 is binarized by the dither shown in FIG. 9, then a pixel 133 of dither matrix size 256 pixels outputs "1", and a pixel 123 thereof becomes "0". An average value with respect to the binarized result of the 256 pixels is 0.52. The error diffusion process has an averaging function, and, therefore, if a portion after the decimal point is held by a value multiplied by the number of pixels which are subjected to area gradation, then the γ-conversion of the real number is not required.

In FIG. 1, the dither process is used to express the values after the decimal point by area gradation. Because only performance of the area gradation is required, the error diffusion may also be acceptable, however, the dither process is preferable because it is performed at high speed. In addition, a dispersion type dither is preferable as the dither to be used than a concentration type dither in order not to cause moire due to interference with the error diffusion unit 111. As the dispersion type dither, Bayer dither is particularly preferable because its dither matrix size is small and the memory is saved.

The coefficients in FIG. 8 are the values obtained by multiplying each value after the decimal point in the conversion table shown in FIG. 6 by the dither matrix size 256 (16×16) shown in FIG. 9 and rounding down each value after the decimal point in resulting values. However, rounded values are preferable because the influence of the rounding error becomes less.

Output values of the area gradation in this method are binary values "0" and "1". The area gradation can also be performed using ternary or quaternary dither by modifying the dither matrix. However, if the ternary or quaternary dither is used, then it may interfere with the error diffusion unit 111, which causes undesirable texture to be output. Therefore, as the result of performing the area gradation on the decimal part, characteristics which become high frequency in frequency space are preferred, and binary values "0" and "1" allow a most preferred image in real space.

If the size of the dither matrix is increased more, the values expressible in the decimal part become finer. The increase in the dither matrix size causes an increase in the memory of the binarization unit 105 that holds the dither, which is not preferred. In the case of 2×2 used for saving in memory, steps of the decimal part that can express gradation become 0.25 units.

When an image is printed on a plain paper by an inkjet printer, a brightness difference between a blank portion of the paper and a portion where an ink is output to its whole surface is smaller than that in a case where an ink is output to an inkjet-specific paper. In this case, if the gradation is expressed by 0.25 step, it is difficult to convert the value to a value expressing target brightness or density considering the dot gain.

Therefore, the dither matrix size is preferably 4×4, 2×8, or 8×2 or more.

Explanation is made now based on an assumption that when a gray-scale level 127 is input, an ideal output value shown in FIG. 6 is 127.5.

FIG. 11 is a conceptual diagram of dots due to the image recording apparatus shown in FIG. 2.

Gray-scale levels of the large and small dots in FIG. 11 are set to 255 and 127, respectively. In a range from gray-scale levels 1 to 127, gray scales are expressed by a mixture of dot-offs and small dots, and in a range from gray-scale levels 128 to 255, gray scales are expressed by a mixture of small dots and large dots. If the ideal output value is 127.5, a converted value obtained by the integer converter 103, the decimal converter 102, and the binarization unit 105 is such that 128 pieces of pixels are converted to 127 and 128 pieces of pixels to 128.

When a threshold value for simple ternary error diffusion is used, a pixel in which a converted value by the integer converter 103, the decimal converter 102, and the binarization unit 105 is 127 outputs a dot-off and a small dot, and a pixel in which a converted value is 128 outputs a small dot and a large dot, which means there is a mixture of the dot-offs, the small dots, and the large dots. The mixture has no problem as the gradation expression, but it is not preferred in terms of the image quality.

Explanation is made based on an assumption that when the threshold setting unit 108 outputs a threshold group thr(x, y) according to an input value as shown in FIG. 10, an ideal output value of the input data In(x, y) is 127.5.

The threshold setting unit 108 outputs a value 0 as an output-determination threshold value thr1(*x, y*) of the dot-off and the small dot in the threshold group thr(x, y). Because the ideal output value is 127.5, it is compared with the value 0 of thr1(*x, y*), and then the dot-off is not output. Therefore, gradations of an image to be output can be expressed by using the small dot and the medium dot. In this manner, by setting the threshold group according to the input value, a preferable result is obtained in terms of the image quality without a mixture of a plurality types of dots in the multi-level error diffusion.

The integerization unit 104 determines, as an integerized value i(x, y), a value obtained by adding 1 to the integer-part converted value ip(x, y) input from the integer converter 103 if the decimal-part converted value dp(x, y) input from the decimal converter 102 is not "0", and this becomes corresponding to conversion to a value obtained by rounding up a value after the decimal part of a real number value after ideal gradation conversion performed according to the input data In(x, y). The decimal-part binary value b(x, y) has different values from "0" and "1" according to address of the decimal-part converted value dp(x, y), however, the threshold value can be obtained uniquely according to the input data In(x, y) by the integerization unit 104.

If a single version is provided, there is no difference between the present invention and the invention described in Patent document 5. When multiple color plates such as for CMYK are to be processed, the invention described in Patent document 5 requires preparation of the decimal converter 102, the integer converter 103, and the threshold setting unit 108 in FIG. 1 by the number of color plates.

On the other hand, the present invention prepares only the decimal converter 102 and the integer converter 103 by the number of color plates, and the threshold setting unit 108 can be commonly set for all the color plates. When multiple color plates such as for CMYK are to be processed and if quantized values are different depending on color plates such as ternary only for an Y-version and quaternary for CMK-color plates, then the invention described in Patent document 5 is more preferable. If values to be quantized are the same as each other even if the CMYK and the color plates are different from each other, then the present invention is more preferable because the threshold setting unit 108 can be shared by the color plates, which allows saving in memory.

Figure 14:
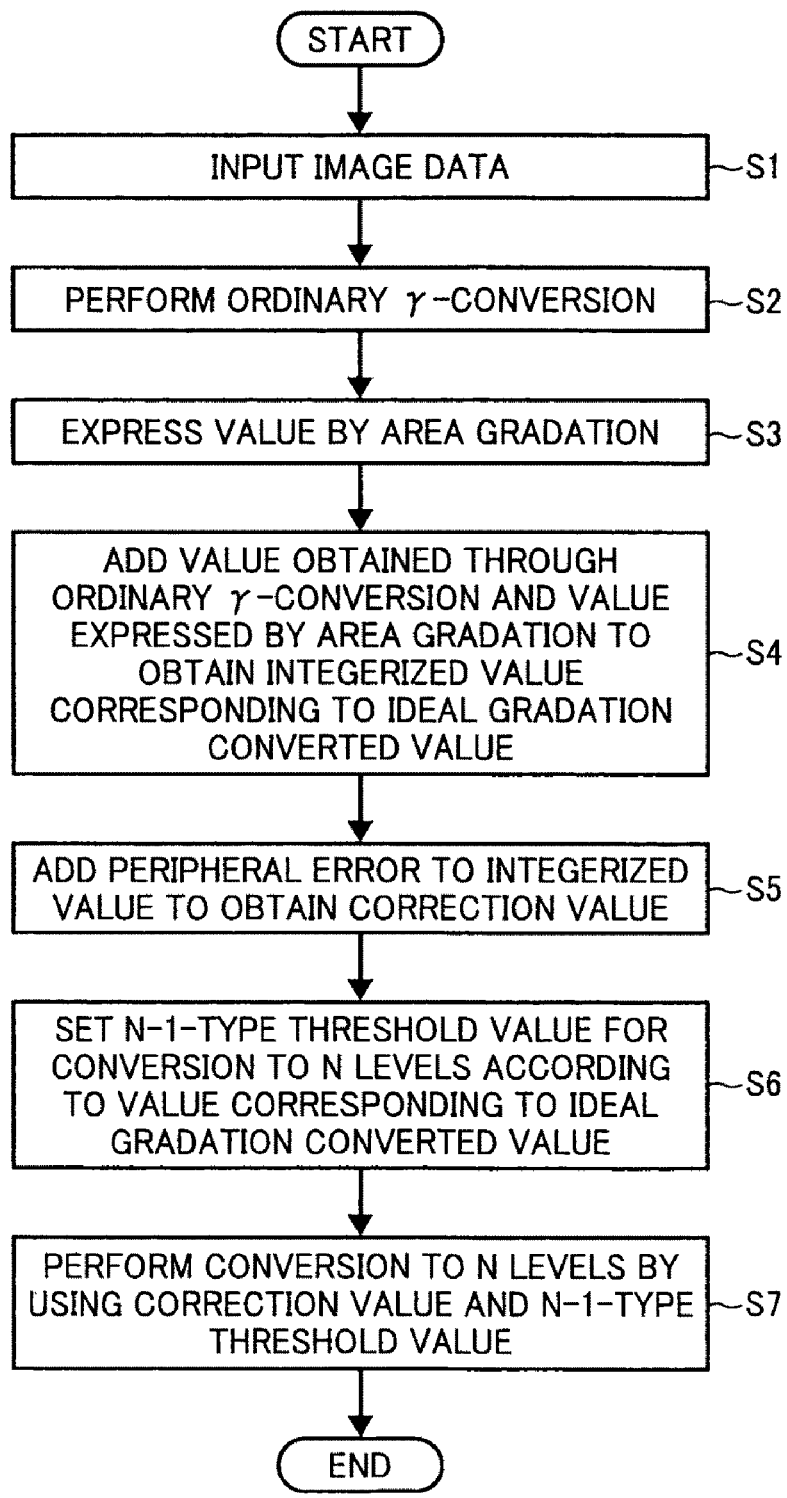
FIG. 14 is an example of a flowchart representing operation in the image processing apparatus shown in FIG. 1.

FIG. 14 is an example of a flowchart representing operation in the image processing apparatus shown in FIG. 1.

The image processing apparatus quantizes multi-level (M-level) image data into N levels (M>N>2) using the multi-level error diffusion method or the multi-level average-error minimization method. In order to express a real number value after ideal gradation conversion so that the input data obtains desired density or brightness, first, image data is input (Step S1).

The integer converter 103 performs ordinary γ-conversion on an integer part in the real number value after the ideal gradation conversion (Step S2).

The decimal converter 102 expresses a decimal part in the real number value, after the ideal gradation conversion, by the area gradation (Step S3).

In the adder 106 and the integerization unit 104, the value obtained through the ordinary γ-conversion and the value expressed by the area gradation are added to each other, and an integerized value corresponding to an ideal gradation converted value is obtained (Step S4).

The comparison-determination unit 109, the subtractor 110, the error diffusion unit 111, the error memory 107, and the adder 106 obtain correction values by adding a peripheral error to the integerized value (Step S5).

The threshold setting unit 108 sets an N−1-type threshold value for conversion to N levels according to a value corresponding to the ideal gradation converted value (Step S6).

The comparison-determination unit 109 performs the conversion to N levels by using the correction value and the N−1-type threshold value (Step S7).

Incidentally, in the embodiment, explanation is made using the ternary error diffusion performed by using the large and small dots as shown in FIG. 11, however, the ternary error diffusion may be performed by using the high- and low-density inks as shown in FIG. 13.

FIG. 13 is a conceptual diagram of another dots due to the image recording apparatus shown in FIG. 2.

In the first embodiment, explanation is made using the ternary error diffusion, however, the present invention is not limited thereto. Thus, quaternary or quinary error diffusion may be performed.

Moreover, the present invention is applied to the error diffusion process, however, the present invention can be also applied to the average-error minimization method.

Further, in the present invention, explanation has been made using the inkjet, however, the present invention can be applied to a plotter capable of performing ordinary multi-level output such as electrophotographic and gravure printing.

It should be noted that the present invention may be applied to a system formed with a plurality of devices (e.g. a host computer, an interface device, a reader, and a printer) and also applied to a single device (e.g. a copy machine and a facsimile device).

Further, it goes without saying that the object of the present invention is also achieved by providing a recording medium in which program codes of software for implementing functions of the first embodiment are stored to the system or the device and causing a computer (CPU: central processing unit or MPU: micro processing unit) of the system or the device to read and execute the program codes stored in the recording medium. In this case, the program codes themselves read from the recording medium implement the functions of the first embodiment.

An example of the program codes is explained below.

A program causing a computer to execute a control process of the image processing apparatus that quantizes multi-level (M-level) image data into N levels (M>N>2) using the multi-level error diffusion method or the multi-level average-error minimization method includes, (1) in order to express a real number value after ideal gradation conversion so that the input data obtains desired density or brightness, (2) a code for a step of causing the integer converter 103 to perform the ordinary γ-conversion on the integer part in the real number value after the ideal gradation conversion, (3) a code for a step of causing the decimal converter 102 to express the decimal part in the real number value after the ideal gradation conversion, by the area gradation, (4) a code for a step of causing the adder 106 to add the value obtained through the ordinary γ-conversion and the value expressed by the area gradation, and obtaining an integerized value corresponding to an ideal gradation converted value, (5) a code for a step of causing the adder 106 to add a peripheral error to the integerized value, and obtaining a correction value, and (6) a code for a step of causing the threshold setting unit 108 to set an N−1-type threshold value for conversion to N levels according to a value corresponding to the ideal gradation converted value, and (7) the conversion to N levels is performed by using the correction value and the N−1-type threshold value.

As a recording medium to supply the program codes, for example, a flexible disk, a hard disk, an optical disc, a magneto-optical disc, a magnetic tape, a nonvolatile memory card, and a ROM (read only memory) can be used.

Moreover, it goes without saying that the result of executing the program codes read by the computer includes not only a case in which the functions of the first embodiment are implemented, but also a case in which an OS (operating system) or the like running on the computer performs a part of or whole of an actual process based on instructions of the program codes, to implement the functions of the first embodiment by the process.

Furthermore, it goes without saying that there is also included a case in which the program codes read from the recording medium are written to a memory provided in a function extension board inserted into the computer or provided in a function extension unit connected to the computer, and then a CPU or the like provided in the function extension board or in the function extension unit performs a part of or whole of an actual process based on instructions of the program codes, to implement the functions of the first embodiment by the process.

The first embodiment of the present invention has been explained above. However, the first embodiment indicates only one example of preferred embodiments of the present invention, and thus the present invention is not limited thereto. Therefore, various modifications may be made within the scope of the present invention without departing from the spirit thereof.

As is clear from the explanation, according to the present invention, by expressing a value after the decimal point of an ideal gradation value by the area gradation upon the gradation conversion in the error diffusion, that is, the gradation conversion in the multi-level error diffusion, the problem on image quality degradation due to the dot gain is resolved. By setting a threshold value according to an input value, it is possible to improve gradation capability in the multi-level error diffusion, to resolve the problem on image quality degradation in the multi-level switching portion, to implement saving in memory, and to obtain such a result as an output image with satisfactory image quality.

According to the present invention, the image processing apparatus quantizes multi-level (M-level) image data into N levels (M>N>2) using the multi-level error diffusion method or the multi-level average-error minimization method. In order to express a real number value after ideal gradation conversion so that the input data obtains desired density or brightness, the image processing apparatus includes a unit for performing the ordinary γ-conversion on the integer part in the real number value after the ideal gradation conversion, a unit for expressing the decimal part in the real number value after the ideal gradation conversion by the area gradation, a unit for adding the value obtained through the ordinary γ-conversion and the value expressed by the area gradation, and a unit for setting an N−1-type threshold value for conversion to N levels according to a value corresponding to the ideal gradation converted value. The provision of the units allows resolution of the problem on the image quality degradation due to the dot gain in the multi-level error diffusion, resolution of the problem on the image quality degradation in the multi-level switching portion, and achievement of saving in memory.

According to the present invention, the expression of the area gradation is performed by using the dither process, which allows resolution of the problem on the image quality degradation due to the dot gain with reduced memory and at high speed.

According to the present invention, there is included a LUT (Look Up Table) that stores therein a value obtained by rounding a value obtained by multiplying a decimal part by a matrix size in the dither process or a value obtained by rounding down a value after the decimal point for each gradation, which allows resolution of the problem on the image quality degradation due to the dot gain.

According to the present invention, by using the dispersion type dither, it is possible to suppress interference with the error diffusion process in the subsequent stage.

According to the present invention, by using the Bayer dither, it is possible to suppress interference with the error diffusion process in the subsequent stage and to design the apparatus with reduced memory.

According to the present invention, by setting the area gradation to a value of 0 or 1 obtained by binarizing the value stored in the LUT using the dither, it is possible to suppress interference with the error diffusion process in the subsequent stage.

According to the present invention, as the value corresponding to the ideal gradation converted value, the integer part in the real number value after the ideal gradation conversion is set to a value obtained by adding 1 to a value after the ordinary γ-conversion when the decimal part in the real number value after the ideal gradation conversion is not 0. This allows solution of the problem on the image quality degradation due to the dot gain in the multi-level error diffusion, solution of the problem on the image quality degradation in the multi-level switching portion, and achievement of saving in memory.

Next, a second embodiment different from the first embodiment is explained below.

An image processing apparatus or an image recording apparatus according to the second invention is an image processing apparatus that converts input M-level image data to N levels (M and N: positive integer, M>N>2). The image processing apparatus includes a unit for converting the input M-value image data to a value corresponding to an integer part with an ideal number of gradations by which desired density or brightness is obtained, a unit for converting the input M-value image data to a value expressing a decimal part with an ideal number of gradations, by which desired density or brightness is obtained, using area gradation, a unit for determining correction data obtained by adding the value corresponding to the integer part with the ideal number of gradations obtained through the conversion and the value expressing the decimal part with the ideal number of gradations obtained through the conversion, by the area gradation, and a unit for converting the M-level image data to N-level image data based on the determined correction data and a predetermined threshold value.

Figure 15:
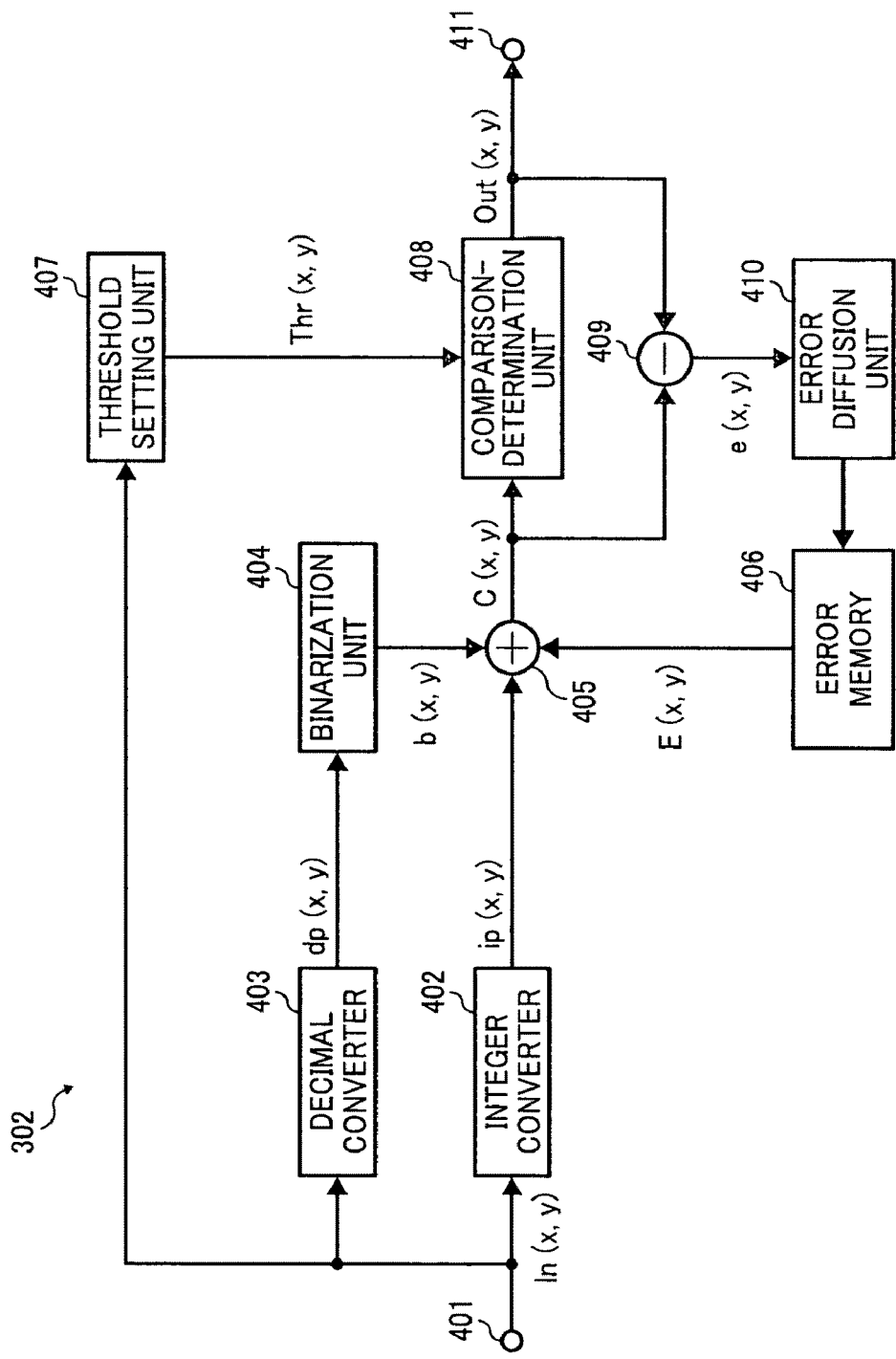
FIG. 15 is a block diagram representing a functional configuration of an image processing apparatus according to a second embodiment.

FIG. 15 is a block diagram representing a functional configuration of the image processing apparatus according to the second embodiment, and particularly shows a block configuration of the image processing apparatus that performs characteristic image processing according to the second embodiment. FIG. 16 is a diagram representing an example of a dither matrix according to the second embodiment. The rest of the configurations of the image processing apparatus and the image recording apparatus according to the second embodiment are the same as these of the first embodiment, and thus, redundant explanation thereof is omitted and the figures related to the explanation are cited if necessary.

As shown in FIG. 15, an input terminal 401 of the image processing apparatus 302 inputs thereto multi-level image data from the image input apparatus 301, and outputs the data to an integer converter 402, a decimal converter 403, and to a threshold setting unit 407.

Here, two-dimensional image data is expressed as In(x, y), where x represents address of the image data in the main scanning direction and y represents address of the image data in the sub-scanning direction.

The integer converter 402 holds the conversion table (LUT) shown in FIG. 7, converts the input image data (input value) In(x, y) to a corresponding integer-part output value ip(x, y) based on the conversion table (LUT), and outputs the converted value to an adder 405.

Likewise, the decimal converter 403 holds the conversion table (LUT) shown in FIG. 8, converts the input image data (input value) In(x, y) to a corresponding decimal-part converted value dp(x, y) based on the conversion table (LUT), and outputs the converted value to a binarization unit 404.

The threshold setting unit 407 sets a threshold group Thr(x, y) according to the input value In(x, y) shown in FIG. 10, and outputs the threshold group Thr(x, y) to a comparison-determination unit 408.

The threshold group Thr(x, y) mentioned here is composed of a first threshold value $Thr1(x, y)$ used to determine a dot-off and a small dot, and a second threshold value $Thr2(x, y)$ used to determine a small dot and a large dot.

The binarization unit 404 holds a table of a list of binarized threshold values shown in FIG. 16, uses a binarized threshold value bt(x, y) in the table corresponding to address (x, y) of the input image data In(x, y) and a decimal-part converted value dp(x, y) input from the decimal converter 403, to determine a decimal-part binary value b(x, y) through computation of the following equation (8), and outputs the resulting value to the adder 405.

$$b(x, y) = \begin{cases} \text{If } bt(x, y)g.e.dp(x, y) \to 1 \\ \text{otherwise} \to 0 \end{cases} \quad (8)$$

The adder 405 calculates and determines correction data C(x, y) by adding the integer-part converted value ip(x, y) input from the integer converter 402, the decimal-part binary value b(x, y) input from the binarization unit 404, and an error component E(x, y) input from an error memory 406, and outputs the correction data C(x, y) to the comparison-determination unit 408 and a subtractor 409.

The comparison-determination unit 408 uses the correction data C(x, y) input from the adder 405 and the threshold group Thr(x, y) input from the threshold setting unit 407, to determine an output value Out(x, y) through computation of the following equation (9), and outputs the resulting value to an output terminal 411.

The threshold group Thr(x, y) mentioned here is composed of an output-determination threshold value Thr1(x, y) for a dot-off and a small dot, and of an output-determination threshold value Thr2(x, y) for a small dot and a large dot.

$$\text{Out}(x, y) = \begin{cases} \text{If } Thr2(x, y)g.e.C(x, y) \to 2 \\ \text{Else if } Thr1(x, y)g.e.C(x, y) \to 1 \\ \text{otherwise} \to 0 \end{cases} \quad (9)$$

The output terminal 411 outputs the Out(x, y) input from the comparison-determination unit 408 to the image output apparatus 303, and also outputs to the subtractor 409.

The subtractor 409 uses the correction data C(x, y) input from the adder 405 and the output value Out(x, y) input from the comparison-determination unit 408 to calculate an error e(x, y) produced in a current pixel through computation of the Equation (3), and outputs the error to an error diffusion unit 410.

The error diffusion unit 410 distributes the error e(x, y) based on preset diffusion coefficients and adds each distributed error to error data E(x, y) stored in the error memory 406.

For example, if the coefficients shown in FIG. 12 are used as diffusion coefficients, the error diffusion unit 410 performs computation processes of the Equations (4) to (7).

In this manner, the image processing apparatus 302 shown in FIG. 15 performs a binary error diffusion process.

It should be noted that the reason why the above process is effective against the dot gain during the multi-level error diffusion process is the same as that of the first embodiment.

The image processing apparatus 302 shown in FIG. 15 shows the case in which the dither process is used to express a value after the decimal point by the area gradation, and the error diffusion may also be acceptable because only performance of the area gradation is required. However, the dither process is preferable because it can be performed at high speed.

Moreover, as the dither process executed by the image processing apparatus 302, a dispersion type dither process is more preferably used than a concentration-type dither process not to cause moire to appear due to interference with the error diffusion unit 410.

Furthermore, as the dispersion type dither process, the Bayer dither process is particularly preferable because this process requires only a small dither matrix size, which allows saving in memory.

Each of the coefficients in the conversion table shown in FIG. 8 is a value obtained by multiplying each value after the decimal point in the conversion table shown in FIG. 6 by the dither matrix 256 (16×16) of the conversion table shown in FIG. 16 and rounding down a value after the decimal point of the resulting value. Rounded values are preferable because the influence of error derived from division process less.

In addition, this method shows the case in which output values of the area gradation are binary values 0 and 1, however, the area gradation may also be performed using ternary or quaternary dither by modifying the dither matrix.

However, the ternary or quaternary dither may cause interference with the error diffusion unit 410, and undesirable texture may be output. Therefore, as the result of performing the area gradation on the decimal part, characteristics which become high frequency in frequency space are preferred, and binary values "0" and "1" allow a most preferred image in real space.

Furthermore, if the size of the dither matrix is increased more, the values that can be expressed in the decimal part become finer.

Meanwhile, the increase in the dither matrix size causes an increase in the memory of the binarization unit 404 that holds the dither, which is not preferred. For example, in the case of 2×2 used for saving in memory, steps of the decimal part that can express gradations become 0.25 units.

This indicates that when an image is printed on a plain paper by an inkjet printer, a brightness difference between a blank portion of the paper and a portion where an ink is output to its whole surface is smaller than that in a case where an ink is output to an inkjet-specific paper.

In this case, if the gradation is expressed by 0.25 step, it is difficult to convert the value to a value expressing target brightness or density considering the dot gain.

Therefore, the dither matrix size is preferably 4×4, 2×8, or 8×2 or more.

Explanation is made based on an assumption that when a gray-scale level, for example, 127 is input, and an ideal output value shown in FIG. 6 is 127.5.

Gray-scale levels of the large and small dots in FIG. 11 are set to 255 and 127, respectively. In a range from the gray-scale levels 1 to 127, the gray scale is expressed by a mixture of dot-offs and small dots, and in a range from the gray-scale levels 128 to 255, the gray scale is expressed by a mixture of small dots and large dots.

If the ideal output value is 127.5, a converted value by the integer converter 402, the decimal converter 403, and the binarization unit 404 is such that 128 pieces of pixels 128 are converted to 127 and 128 pieces of pixels to 128.

When a threshold value for simple ternary error diffusion is used, a pixel in which a converted value obtained by the integer converter 402, the decimal converter 403, and by the binarization unit 404 is 127 outputs a dot-off and a small dot, and a pixel in which a converted value is 128 outputs a small dot and a large dot, which indicates there is a mixture of the dot-offs, the small dots, and the large dots. The mixture has no problem as the gradation expression, but it is not preferred in terms of the image quality.

Explanation is made based on an assumption that when the threshold setting unit 407 outputs a threshold group thr(x, y) according to an input value as shown in FIG. 10, an ideal output value of the input data In(x, y) is 127.5.

The threshold setting unit 407 outputs a value 0 as an output-determination threshold value thr1(x, y) of the dot-off and the small dot in the threshold group thr(x, y).

Because the ideal output value is 127.5, the dot-off is not output as a result of comparison with the value 0 of thr1(x, y). Therefore, gradations of an image to be output are expressed by using the small dot and the medium dot.

In this manner, by setting the threshold group according to the input value, a desirable result in terms of the image quality is obtained without a mixture of a plurality types of dots in the multi-level error diffusion.

As is clear from the explanation, according to the image input-output system of the second embodiment, by expressing a value after the decimal point of an ideal gradation value by the area gradation upon the gradation conversion in the error diffusion, that is, the gradation conversion in the multi-level error diffusion, the problem on the image quality degradation due to the dot gain is resolved, and by setting a threshold value according to an input value, it is possible to improve gradation capability in the multi-level error diffusion, suppress the image quality degradation in the multi-level switching portion, and obtain such a result as an output image with satisfactory image quality.

Moreover, it is possible to resolve the problem on the image quality degradation due to the dot gain in the multi-level error diffusion and the problem on the image quality degradation in the multi-level switching portion.

Furthermore, it is possible to resolve the problem on the image quality degradation due to the dot gain with reduced memory and at high speed.

Moreover, it is possible to resolve the problem on the image quality degradation due to the dot gain.

Furthermore, it is possible to suppress interference with the error diffusion process in the subsequent stage.

Moreover, it is possible to suppress interference with the error diffusion process in the subsequent stage and to design the apparatus with reduced memory.

Furthermore, it is possible to suppress interference with the error diffusion process in the subsequent stage.

Next, the image input-output system in FIG. 3 shows the apparatuses respectively provided as independent ones according to the processes, however, the system configuration is not limited thereto. Thus, there are also some other configurations, in one of which the function of the image processing apparatus 302 may exist in the image input apparatus 301, and in another one of which the function of the image processing apparatus 302 may exist in the image output apparatus 303.

The second embodiment has explained the ternary error diffusion using the large dot and the small dot shown in FIG. 11, however, the ternary error diffusion process may be performed using a low-density dot shown in (a) of FIG. 13 and a high-density dot shown in (b) of FIG. 13.

Furthermore, the second embodiment has explained the ternary error diffusion process, however, a quaternary error diffusion process or a quinary error diffusion process may be performed.

Moreover, the second embodiment has explained the error diffusion process, however, the second embodiment can also be applied to the process for the average-error minimization method.

Furthermore, the second embodiment has explained the example of using the inkjet image recording apparatus, however, the present invention can also be applied to ordinary plotters including electrophotographic printing, offset printing, and gravure printing in the above manner.

Moreover, the present invention may be applied to a system formed with a plurality of devices (e.g., a host computer, an interface device, a reader, and a printer) and also applied to a single device (e.g., a copy machine and a facsimile device).

Furthermore, it goes without saying that the present invention is also achieved by providing a recording medium that stores therein the program codes of the software for implementing the function of the image processing apparatus according to the second embodiment to the image input-output system and the image forming apparatus, and causing the computer (CPU or MPU) of the image input-output system or the image forming apparatus to read and execute the program codes stored in the recording medium.

In this case, the program codes themselves read from the recording medium implement the functions of the second embodiment.

As a recording medium to supply the program codes, various types of recording media including, for example, a flexible disk, a hard disk, an optical disc, a magneto-optical disc, a magnetic tape, a nonvolatile memory card, and a ROM can be used.

Moreover, it goes without saying that the result of executing the program codes read by the computer includes not only a case in which the functions of the second embodiment are implemented but also a case in which an operating system (OS) or the like running on the computer performs a part of or whole of an actual process based on instructions of the program codes to implement the functions of the second embodiment by the process.

Furthermore, it goes without saying that there is also included a case in which the program codes read from the recording medium are written to a memory provided in a function extension board inserted into the computer or in a function extension unit connected to the computer, and then a CPU or the like provided in the function extension board or in the function extension unit performs a part of or whole of an actual process based on instructions of the program codes to implement the functions of the second embodiment by the process.

It should be noted that the second embodiment indicates one example of the preferred embodiments of the present invention, and thus the present invention is not limited thereto. Therefore, various modifications may be made within the scope of the present invention without departing from the spirit thereof.

The image processing apparatus, the image recording apparatus, and the program according to the present invention can be applied to the device as a single unit such as a copy machine and a facsimile device, and also applied to the system formed with a host computer, an interface device, a reader, and a printer.

According to the present invention, by expressing a value after the decimal point of an ideal gradation value by the area gradation upon the gradation conversion in the error diffusion, that is, the gradation conversion in the multi-level error diffusion, the problem on image quality degradation due to the dot gain is resolved. By setting a threshold value according to an input value, it is possible to improve gradation capability in the multi-level error diffusion, resolve the problem on image quality degradation in the multi-level switching portion, implement saving in memory, and obtain such a result as an output image with satisfactory image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that quantizes multi-level (M-level) image data into N levels (M>N>2) using a multi-level error diffusion method or a multi-level average-error minimization method, the image processing apparatus comprising:

a γ-conversion unit that performs γ-conversion on an integer part in a real number value after ideal gradation conversion that aims to obtain desired density or brightness;

an area-gradation expressing unit that expresses a decimal part by area gradation, the decimal part being in the real number value after the ideal gradation conversion;

an integerization unit that adds a value obtained through the γ-conversion and a value expressed by the area gradation to obtain an integerized value corresponding to a value of the ideal gradation conversion;

a correction unit that adds a peripheral error to the integerized value to obtain a correction value; and a threshold setting unit that sets an N−1-type threshold value for a value corresponding to the value after the ideal gradation conversion, wherein the conversion to N levels is performed by using the correction value and the N−1-type threshold value, to thereby express the real number value after the ideal gradation conversion so that input multi-level (M-level) image data obtains the desired density or brightness.

2. The image processing apparatus according to claim 1, wherein expression of the area gradation is performed by using a dither process.

3. The image processing apparatus according to claim 1 that is provided with a LUT (look up table) that
stores therein a value obtained in such a manner that the decimal part is multiplied by a matrix size for the dither process and then multiplied decimal part is rounded, or
stores therein a value obtained by rounding down a value after a decimal point,
for each gradation.

4. The image processing apparatus according to claim 1, wherein a dispersion type dither is used as the dither process.

5. The image processing apparatus according to claim 1, wherein Bayer type dither is used as the dither process.

6. The image processing apparatus according to claim 3, wherein the area gradation includes a value 0 or 1 obtained by binarizing a value stored in the LUT (look up table) using the dither.

7. The image processing apparatus according to claim 1, wherein as a value corresponding to the ideal gradation converted value, the integer part in the real number value after the ideal gradation conversion is a value obtained by adding 1 to a value after the ordinary γ-conversion, when the decimal part, in the real number value after the ideal gradation conversion, is not 0.

8. An image processing method for an image processing apparatus that quantizes multi-level (M-level) image data into N levels (M>N>2) using a multi-level error diffusion method or a multi-level average-error minimization method, the image processing method comprising:

γ-converging by a γ-conversion unit that performs γ-conversion on an integer part in a real number value after ideal gradation conversion that aims to obtain desired density or brightness;

area-gradation expressing by an area-gradation expressing unit that expresses a decimal part by area gradation, the decimal part being in the real number value after the ideal gradation conversion;

integerizing by an integerizing unit that adds a value obtained through the γ-conversion and a value expressed by the area gradation to obtain an integerized value corresponding to a value of the ideal gradation conversion;

correcting by a correcting unit that adds a peripheral error to the integerized value to obtain a correction value; and threshold setting by a threshold setting unit that sets an N−1-type threshold value for a value corresponding to the value after the ideal gradation conversion, wherein the conversion to N levels is performed by using the correction value and the N−1-type threshold value, to thereby express the real number value after the ideal gradation conversion so that input multi-level (M-level) image data obtains the desired density or brightness.

9. The image processing method according to claim 8, wherein the area-gradation expressing is performed by using a dither process.

10. The image processing method according to claim 8 wherein the image processing apparatus has a LUT (look up table) that
stores therein a value obtained in such a manner that the decimal part is multiplied by a matrix size for the dither process and then multiplied decimal part is rounded, or
stores therein a value obtained by rounding down a value after a decimal point,
for each gradation.

11. The image processing method according to claim 8, wherein a dispersion type dither is used as the dither process.

12. The image processing method according to claim 8, wherein Bayer dispersion type dither is used as the dither process.

13. The image processing apparatus according to claim 10, wherein the area gradation includes a value 0 or 1 obtained by binarizing a value stored in the LUT (look up table) using the dither.

14. The image processing method according to claim 8, wherein as a value corresponding to the ideal gradation converted value, the integer part in the real number value after the ideal gradation conversion is a value obtained by adding 1 to a value after the ordinary γ-conversion, when the decimal part, in the real number value after the ideal gradation conversion, is not 0.

15. A non-transitory computer-readable medium storing a program for causing a computer to execute a control process of an image processing apparatus that quantizes multi-level (M-level) image data into N levels (M>N>2) using a multi-level error diffusion method or a multi-level average-error minimization method, in order to express a real number value after ideal gradation conversion so that input multi-level (M-level) image data obtains desired density or brightness, the program comprising:

a code for performing γ-conversion on an integer part in the real number value after the ideal gradation conversion;

a code for expressing a decimal part by area gradation, the decimal part being in the real number value after the ideal gradation conversion;

a code for adding a value obtained through the γ-conversion and a value expressed by the area gradation to obtain an integerized value corresponding to an ideal gradation converted value;

a code for adding a peripheral error to the integerized value to obtain a correction value; and a code for setting an N−1-type threshold value for conversion to N levels according to a value corresponding to the ideal gradation converted value, wherein the conversion to N levels is performed by using the correction value and the N−1-type threshold value.

* * * * *